(No Model.)
J. E. MARTIN.
BICYCLE DRIVING GEAR.
No. 592,156. Patented Oct. 19, 1897.
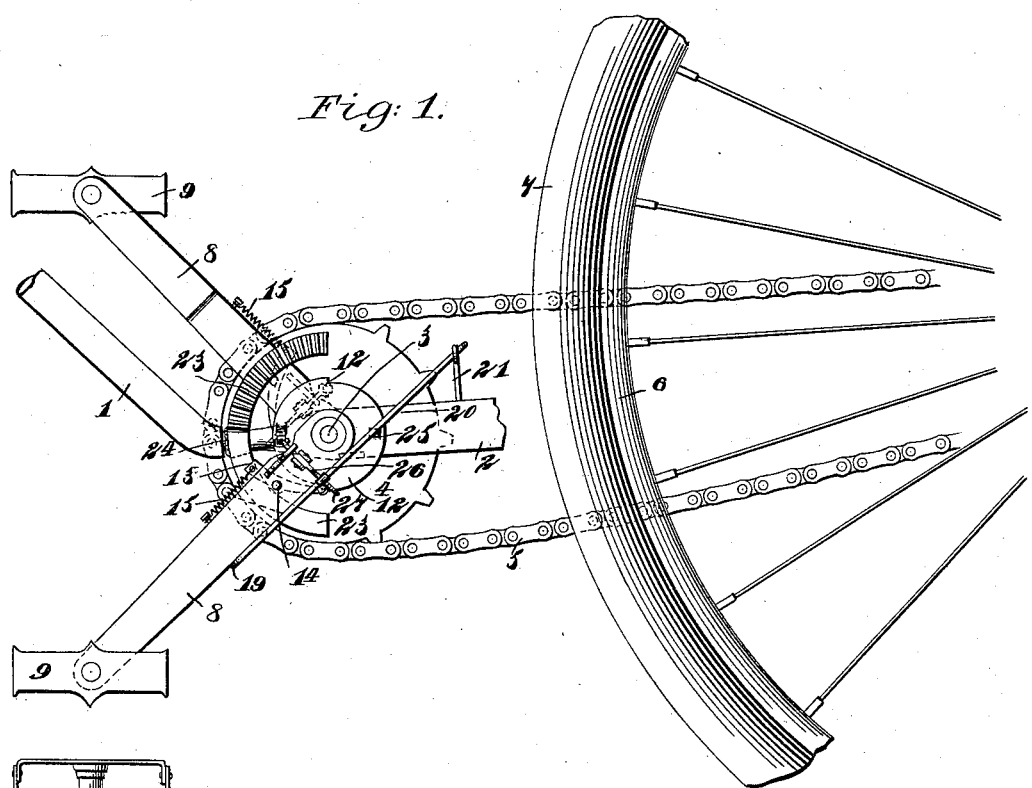
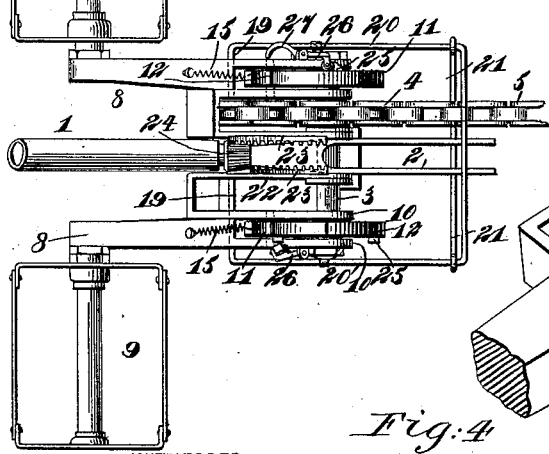
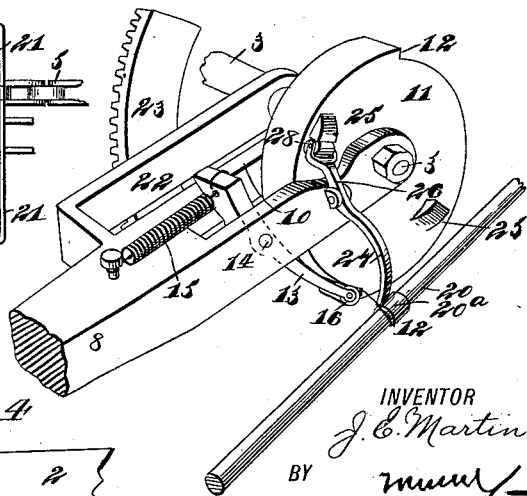
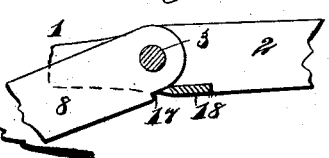
WITNESSES:
INVENTOR
J. E. Martin
BY
ATTORNEYS.

UNITED STATES PATENT OFFICE.

JAMES ELMER MARTIN, OF NICHOLSON, NORTH DAKOTA.

BICYCLE DRIVING-GEAR.

SPECIFICATION forming part of Letters Patent No. 592,156, dated October 19, 1897.

Application filed April 20, 1896. Serial No. 588,343. (No model.)

*To all whom it may concern:*

Be it known that I, JAMES ELMER MARTIN, of Nicholson, in the county of Sargent and State of North Dakota, have invented a new and Improved Bicycle Driving-Gear, of which the following is a full, clear, and exact description.

This invention relates to certain improvements in driving-gear for bicycles and similar vehicles, and has for its object to provide a gear of this character, of a simple and inexpensive nature, which shall be light and strong in construction and sufficiently compact to be employed in connection with bicycles of the ordinary style without requiring any material change therein.

The invention contemplates certain novel features in the construction, combination, and arrangement of the various parts of the improved gear, whereby certain important advantages are attained, and the gearing is made simpler, cheaper, and otherwise better adapted and more convenient for use than various other similar devices heretofore employed, all as will be hereinafter fully set forth. The novel features of the invention will be carefully defined in the claims.

Reference is to be had to the accompanying drawings, forming a part of this specification, in which similar characters of reference indicate corresponding parts in all the views.

Figure 1 is a fragmentary side view showing portions of a bicycle provided with a driving-gear constructed in accordance with my invention. Fig. 2 is a fragmentary plan view of the same parts. Fig. 3 is a perspective view drawn to an enlarged scale and showing the devices connected to and actuated from one of the pedal-levers, and Fig. 4 is an enlarged fragmentary sectional view showing the device employed for limiting the downward movement of the levers.

In the views, 1 indicates a fragment of a bicycle-frame, to the lower portion of which are connected the backstays of the frame, said frame being provided with forks 2, projecting rearwardly, as shown in Figs. 1 and 2, and adapted to receive the said stays. In the stays is journaled the rear driving-wheel, having a rim 6, and a pneumatic tire 7 in the usual way, and at the lower part of the frame is journaled the crank shaft or axle 3, having a sprocket-wheel 4, over which passes a chain 5, the rear end of which is arranged over a sprocket-wheel mounted on the hub of the driving-wheel, whereby said wheel is driven from the movement of the crank shaft or axle, as will be readily understood.

On opposite ends of the crank axle or shaft 3 are loosely mounted the pedal-levers 8, these levers being arranged, as clearly shown in Figs. 1 and 2, to project forwardly from the crank-axle, or in a direction opposite to that in which the chain 5 extends, and in the operation of the gearing the rider presses alternately upon the respective levers, so as to move them downward, the movement of the levers being transmitted to the axle, so as to drive the vehicle by means which I will now describe.

Each pedal-lever 8 is provided with pedals 9 at its forward end, and at its rear end each lever is forked, as indicated at 10, the forks being spaced apart and perforated to receive the crank-shaft whereon they turn, and on the crank-shaft 3 between the forks 10 of the respective levers are mounted ratchet disks or wheels 11, each of said disks or wheels being provided on its periphery with diametrically opposite teeth 12, adapted to be engaged by dogs or pawls 13, pivoted, as indicated at 14, between the forks 10 of the levers and provided with springs 15 to hold them normally in position to engage the teeth 12. At their ends the dogs or pawls 13 are provided with rollers 16 to reduce the friction of the pawls upon the periphery of the ratchet wheels or disks 11.

As shown in the drawings, the teeth 12 on the respective ratchet disks or wheels 11 at opposite ends of the crank shaft or axle 3 are set quartering to each other, and said teeth and the dogs by which they are engaged are so arranged that when one of the levers 8 is pressed downward its dog or pawl 13 will engage one of the teeth 12 of the corresponding ratchet wheel or disk 11, so as to impart rotative movement to the said disk, and also to the crank-shaft whereon the disk is fixed, to an extent equal to a quarter-turn of these parts, this movement serving to bring one tooth 12 of the other ratchet disk or wheel into position to be engaged by the dog or pawl 13 of the other pedal-lever when the same is in a raised position, it being understood that said levers are designed to swing through but a quarter of a circle.

To limit the downward stroke of the pedal-levers 8, I prefer to provide each lever with a shoulder 17 on its under side, as clearly shown in the detail view Fig. 4, and the shoulders of the respective levers 8 are adapted to engage when the levers are pressed downward, as shown in that figure, the opposite ends of a stop-bar 18, secured at its central part to the under side of the frame 1 beneath the crank-shaft 3, and having its opposite ends extending into the paths of the levers.

An auxiliary stop or frame 19 is also arranged beneath the lever 8, as clearly seen in Fig. 1, said frame being of a general rectangular form, as shown in Fig. 2, and being set in an inclined position with its side bars 20 extending up on opposite sides of the levers, and the rear end of the frame is supported by braces 21, extending from the forks 2 of the frame.

On the side bars 20 of the frame 19 are arranged rollers 20$^a$, adapted to engage the curved ends 27 of dogs 26, pivoted on the cranks 8, and having at their ends rollers 28, adapted to engage teeth or lugs 25 formed on the outer surfaces of the ratchet disks or wheels 11, as clearly shown in the detail view Fig. 3. These teeth or lugs 25 are arranged to engage the dogs and hold the levers against moving backward or at a less speed than the speed of the ratchet disks or wheels 11, so that the rider may be able to hold back the wheel in case it is desired to stop or to slow up in going downhill.

To the inner face of each lever 8 is secured a frame or bracket 22, extending inward parallel to the lever and collared at its inner end on the crank-shaft 3, as shown in Figs. 2 and 3, and on the respective brackets 22 are secured segmental racks 23, having beveled gear-faces meshing with a bevel-pinion 24, mounted to turn on the frame 1 just in front of the crank axle or shaft 3. By this arrangement it will be seen that when one of the pedal-levers is pressed downward the engagement of its segment-rack 23 with the bevel-pinion 24 will impart rotation to said pinion in such a way as to cause the other pedal-lever 8 to move upward, as will be readily understood.

In operation, when one of the levers 8 is pressed down to the position indicated in Fig. 1, the other lever will be raised, and the dog 13 on the lever which is pressed down will engage one of the teeth of the corresponding ratchet wheel or disk 11. As the lever turns when depressed through substantially a quarter of a circle, it is evident that a quarter-rotation will be imparted to the crank-shaft 3, which will serve to carry one of the teeth 12 of the other ratchet wheel or disk 11 into position to be engaged by the dog 13 of the other lever.

As the lever moves down in engagement with the tooth 12 of the ratchet disk or wheel 11 the dog 26, carried on said lever, will engage behind one of the lugs 25 on the side of the ratchet-wheel, and this engagement will serve to hold the lever locked to the ratchet-wheel against backward movement, and when the lever reaches the end of its downstroke the bent arm 27 of said dog 26 will engage the roller 20$^a$ on the side bar 20 of the stop-frame 19, whereby said dog will be swung out of engagement with the lug 25, and the lever will be freed, so as to permit it to be moved back when the other lever is pressed down.

From the above description it will be seen that the device is of an extremely simple and inexpensive construction, and is especially well adapted for the purposes for which it is designed; and it will also be obvious that the invention is susceptible of some modification without material departure from its principles and spirit, and for this reason I do not wish to be understood as limiting myself to the precise form and arrangement of the parts herein set forth.

Having thus described my invention, I claim as new and desire to secure by Letters Patent—

1. In a driving-gear for bicycles and the like, the combination of a frame, a crank-shaft journaled therein, ratchet-disks on the ends of the crank-shaft, lugs on the ratchet-disks, pedal-levers having oppositely-acting dogs engaging respectively the teeth and lugs of the ratchet-wheels, one dog of each lever being arranged to lock the lever against backward movement with respect to its ratchet-disk, a connection between the levers, whereby when one is pressed downward, the other will move upward, and means to disengage said dog when the crank reaches the end of its stroke, substantially as set forth.

2. In a driving-gear for bicycles, the combination of a frame, a crank-shaft journaled therein, ratchet-disks on the ends of the crank-shaft, lugs on the ratchet-disks, pedal-levers having dogs to engage the teeth of the ratchet-disks and having other dogs to engage the lugs on said disks, a connection between the said levers whereby the movement of one crank in one direction causes a movement of the other crank in the opposite direction and a guide-frame having parts to engage and operate the dogs at the downstroke of the cranks, substantially as set forth.

3. In a driving-gear for bicycles, the combination with a crank-shaft provided with toothed wheels having lugs on their faces, pedal-levers having dogs for engaging the teeth of the said wheels and a connection between the levers whereby the movement of one crank in one direction causes a movement of the other crank in the opposite direction, of dogs pivoted to the levers and adapted to engage the lugs of the said wheels, said dogs having downwardly-projecting curved ends, and stops on the frame and with which the ends of the dogs engage to release them from the lugs, substantially as described.

4. In a driving-gear for bicycles, the combination with a crank-shaft provided with toothed wheels having lugs on their side faces and pedal-levers having dogs for engaging the teeth of the wheel, of gearing between the said levers whereby the movement of one crank in one direction causes a movement of the other crank in the opposite direction, dogs pivoted to the levers and adapted to engage the lugs of the toothed wheels, said dogs having downwardly-projecting curved ends, a guide-frame and rollers on the guide-frame for engaging the dogs to release them from the lugs, substantially as herein shown and described.

JAMES ELMER MARTIN.

Witnesses:
J. W. CHRISTIAN,
E. J. HENDRICKS.